United States Patent
Sun et al.

(10) Patent No.: US 9,780,979 B2
(45) Date of Patent: Oct. 3, 2017

(54) ANALOG EQUALIZER

(71) Applicant: MStar Semiconductor, Inc., Hsinchu Hsien (TW)

(72) Inventors: Kai Sun, Shanghai (CN); Jiunn-Yih Lee, Zhubei (TW); Wen-Cai Lu, Shanghai (CN)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/412,576

(22) Filed: Jan. 23, 2017

(65) Prior Publication Data

US 2017/0222848 A1  Aug. 3, 2017

(30) Foreign Application Priority Data

Feb. 3, 2016  (CN) .......................... 2016 1 0076609

(51) Int. Cl.
  *H04L 27/01* (2006.01)
  *H04L 7/00* (2006.01)
  *H04L 25/03* (2006.01)

(52) U.S. Cl.
  CPC ............ *H04L 27/01* (2013.01); *H04L 7/0012* (2013.01); *H04L 25/03273* (2013.01)

(58) Field of Classification Search
  CPC . H04L 27/01; H04L 7/0012; H04L 25/03273; H04L 25/03949; H04L 2027/0038; H04L 2027/004; H04L 2027/0042; H04B 3/04; H04B 3/14; H04B 3/141; H04B 3/145; H04B 7/005
  USPC .................................. 375/229, 230, 231, 232
  See application file for complete search history.

(56) References Cited

U.S. PATENT DOCUMENTS

| 5,670,916 A | * | 9/1997 | Korn | ...................... H04B 3/06 333/18 |
| 7,562,108 B2 | * | 7/2009 | Singh | ................ H04L 25/03878 708/819 |
| 8,417,752 B1 | * | 4/2013 | Chan | ...................... H04B 3/04 708/205 |

(Continued)

FOREIGN PATENT DOCUMENTS

| TW | 201106663 | 2/2011 |
| TW | I336997 | 2/2011 |
| TW | 201136248 | 10/2011 |

OTHER PUBLICATIONS

Taiwan Patent Office "Office Action" dated Jul. 31, 2017, Taiwan.

*Primary Examiner* — Siu Lee
(74) *Attorney, Agent, or Firm* — WPAT, PC

(57) ABSTRACT

A analog equalizer includes: an adjusting circuit, generating an adjustment signal and a selection signal; a cascaded equalization circuit, receiving the adjustment signal, and adjusting at least one of a tunable resistor, a tunable capacitor and a tunable current source in the multi-stage equalization circuit according to the adjustment signal to perform an equalization process on a signal to be equalized; and an analog multiplexer, coupled to the cascaded equalization circuit and the adjusting circuit, selecting and outputting an equalized signal outputted from one stage of the multi-stage equalization circuit according to the selection signal. Wherein, the adjusting circuit adjusts the adjustment signal and the selection signal according to the equalized signal outputted from the analog multiplexer and a target equalization value.

17 Claims, 8 Drawing Sheets

(56) References Cited

U.S. PATENT DOCUMENTS

| | | | | |
|---|---|---|---|---|
| 2004/0141552 A1* | 7/2004 | Yang | ................. | H04L 25/03885 |
| | | | | 375/229 |
| 2006/0023779 A1* | 2/2006 | Kwak | ............... | H04L 25/03885 |
| | | | | 375/229 |
| 2010/0079216 A1* | 4/2010 | Sakano | .................. | H04B 3/145 |
| | | | | 333/2 |
| 2016/0254932 A1* | 9/2016 | Chong | .............. | H04L 25/03019 |
| | | | | 375/233 |
| 2016/0352541 A1* | 12/2016 | Ziv | .................. | H04L 25/03019 |

* cited by examiner

ANALOG EQUALIZER

This application claims the benefit of People's Republic of China application Serial No. 201610076609.6, filed on Feb. 3, 2016, the subject matter of which is incorporated herein by reference.

BACKGROUND OF THE INVENTION

Field of the Invention

The invention relates in general to the electronics field, and more particularly to an analog equalizer.

Description of the Related Art

Demands on high-speed signal transmission technologies are ever-increasing along with developments of electronics technologies. During the transmission of high-speed signals, due to channel interference brought upon by cables, PCB routing wires and connectors, high-speed signals, particularly high-frequency components in high-speed signals, are drastically attenuated.

To allow a receiver to accurately receive a high-speed signal, equalization technologies are extensively applied. In current technologies, high-speed signals applied in different specifications, such as DisplayPort (DP), High-Definition Multimedia Interface (HDMI), Mobile High-Definition Link (MHL), and Universal Serial Bus (USB), have different data rates, different cables, different PCB routing wires and different connectors, and therefore have different requirements on equalization operations. A current equalizer is capable of performing equalization operations on only one certain application instead of satisfying equalization operations of multiple applications. Therefore, there is a need for a solution that satisfies actual application requirements.

SUMMARY OF THE INVENTION

The invention is directed to an analog equalizer capable of realizing equalization for different high-speed signals.

According to an embodiment the present invention, an analog equalizer that receives a signal to be equalized is provided. The analog equalizer includes: an adjusting circuit, generating an adjustment signal and a selection signal; a cascaded multi-stage equalization circuit, receiving the adjustment signal, and adjusting at least one of a tunable resistor, a tunable capacitor and a tunable current source in the multi-stage equalization circuit according to the adjustment signal to perform an equalization operation on a signal to be equalized; and an analog multiplexer, coupled to the cascaded multi-stage equalization circuit and the adjusting circuit, receiving the selection signal, and outputting an equalized signal outputted from one stage of the multi-stage equalization circuit according to the selection signal.

According to the above embodiment, the adjusting circuit adjusts the adjustment signal and the selection signal according to the equalized signal outputted from the analog multiplexer and a target equalization value.

The present invention provides following benefits as opposed to the prior art. In the present invention, by receiving the adjustment signal and the selection signal outputted from the adjusting circuit, adjusting at least one of the tunable resistor, the tunable capacitor and the tunable current source according to the adjustment signal, and selecting equalization circuits of different stages according to the selection signal, the analog equalizer outputs a target equalized signal. With the above approach, the present invention is capable of adaptively configuring the target equalized signal outputted from the simulated equalizer, thereby achieving equalization for different high-speed signals.

The above and other aspects of the invention will become better understood with regard to the following detailed description of the preferred but non-limiting embodiments. The following description is made with reference to the accompanying drawings.

DETAILED DESCRIPTION OF THE INVENTION

Details of the technical solutions according to embodiments of the present invention are given with the accompanying drawings below. It should be noted that these non-limiting embodiments are only a part of but not all possible embodiments of the present invention. Based on the embodiments of the present invention, other variations and modifications made by one person skilled in the art are to be encompassed within the scope of the present invention.

Figure 1:
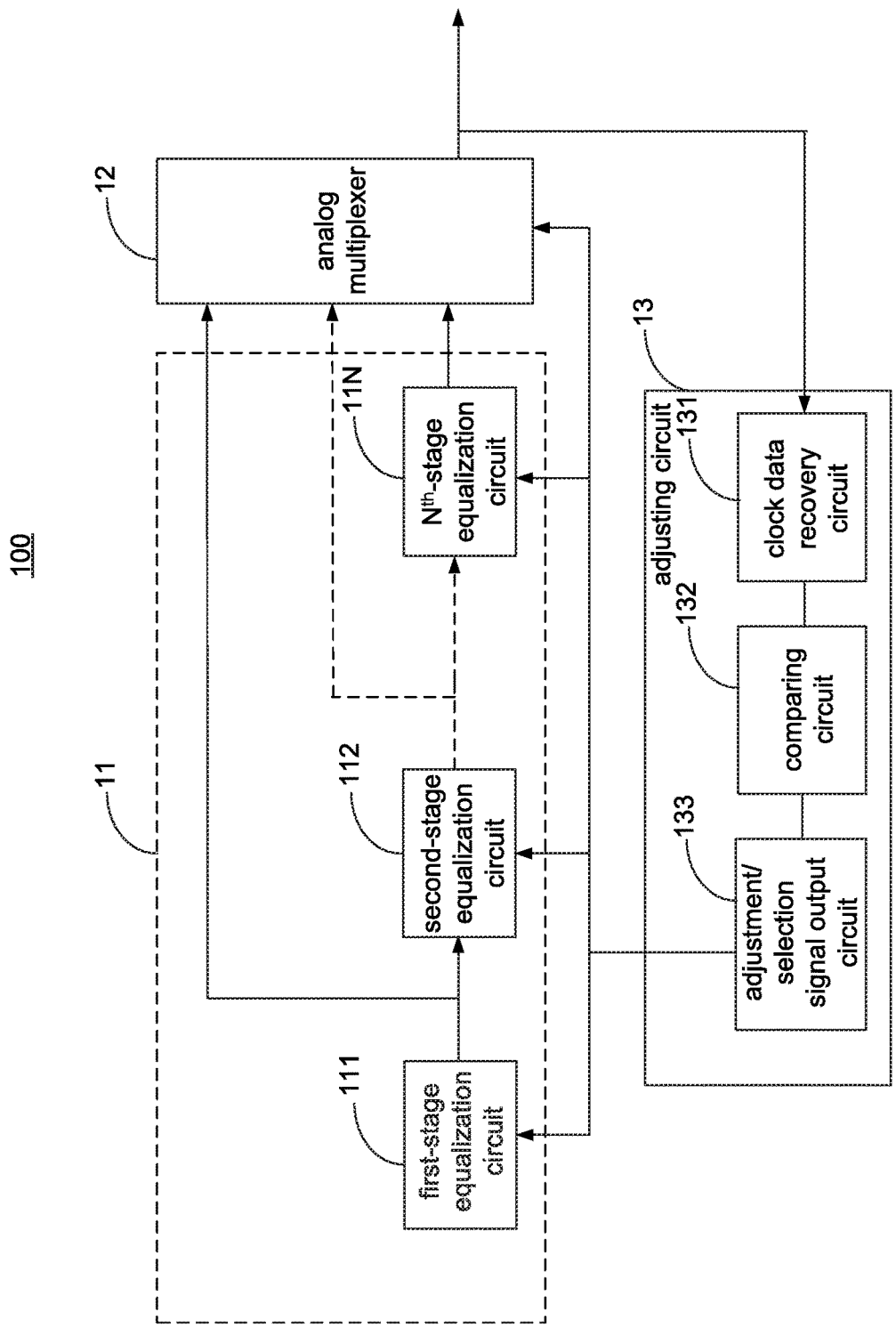
FIG. 1 is a block diagram of an analog equalizer according to a first embodiment of the present invention.

FIG. 1 shows a block diagram of an analog equalizer according to a first embodiment of the present invention. As shown in FIG. 1, an analog equalizer 100 includes a cascaded multi-stage equalization circuit 11, an analog multiplexer 12 and an adjusting circuit 13.

More specifically, the cascaded multi-stage equalization circuit 11 includes a first-stage equalization circuit 111, a second-stage equalization circuit 112, . . . , and an $N^{th}$-stage equalization circuit 11N, where N is a positive integer greater than 1. The term "cascaded" means that an output end of a previous-stage equalization circuit is connected to an input end of a next-stage equalization circuit.

The cascaded multi-stage equalization circuit 11 receives an adjustment signal outputted by the adjusting circuit 13, and adjusts at least one of a tunable resistor, a tunable capacitor and a tunable current source in the multi-stage equalization circuit 11 according to the adjustment signal, to cause the multi-stage equalization circuit 11 to perform an equalization operation on high-speed signals according to requirements.

The analog multiplexer 12, coupled to the cascaded multi-stage equalization circuit 11 and the adjusting circuit 13, receives a selection signal outputted from the adjusting circuit 13, and selects the equalization circuit corresponding to an appropriate stage according to the selection signal to cause an actual output value of the analog equalizer 10 to be equal to a target equalization value corresponding to the selected equalization circuit.

The adjusting circuit 13 generates the adjustment signal and the selection signal. More specifically, the adjusting circuit 13 includes a clock data recovery circuit 131, a comparing circuit 132 and an adjustment/selection signal output circuit 133. An input end of the clock data recovery circuit 131 is connected to an output end of the analog multiplexer 12, and an output end of the clock data recovery circuit 131 is connected to an input end of the comparing circuit 132. An output end of the comparing circuit 132 is connected to an input end of the adjustment/selection signal output circuit 133, and an output end of the adjustment/selection signal output circuit 133 outputs the adjustment signal and the selection signal.

Figure 2:
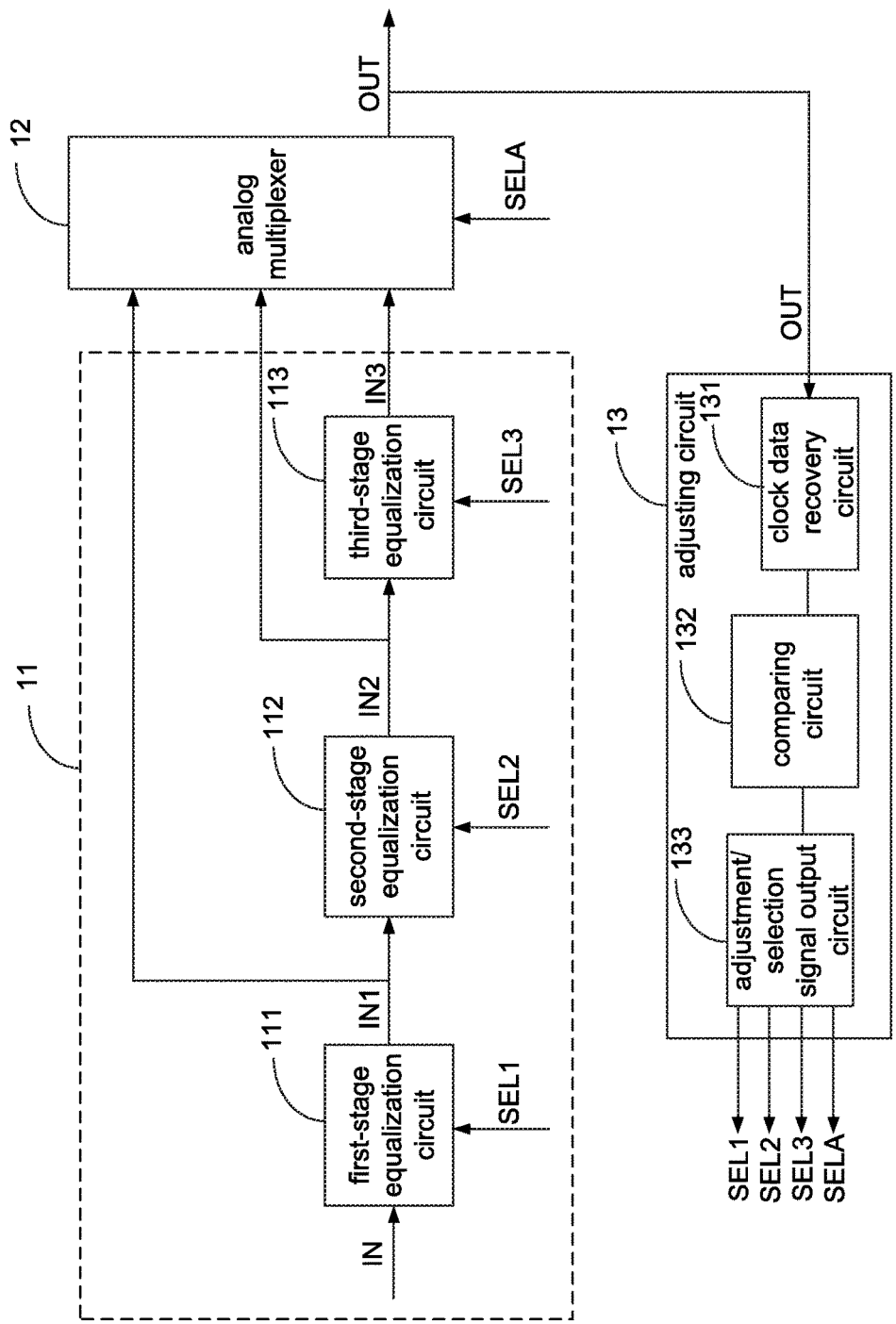
FIG. 2 is a block diagram of an application of an analog equalizer according to the first embodiment of the present invention.

Operation principles of the adjusting circuit 13 are as follows. After the analog equalizer 100 starts to operate, the tunable resistor, the tunable capacitor and the tunable current source in the multi-stage equalization circuit 11 operate according to default values, and the analog multiplexer 12 selects one of the equalization circuits in the multi-stage equalization circuit 11 to operate to output an equalized signal, which is then inputted into the clock data recovery circuit 131 for clock signal recovery. The clock data recovery circuit 131 generates a clock signal to again sample the equalized signal to obtain a pulse string. When the clock data recovery circuit 131 operates in a first mode, it generates the clock signal according to a signal transmitted in an interface clock channel. For example, the first mode is an HDMI interface mode or an MHL interface mode. When the clock data recovery circuit 131 operates in a second mode, it generates the clock signal according to frequency information included in the equalized signal. For example, the second mode is a DP interface mode, a USB interface mode, or a V-by-one mode developed in image transmission. In the recovered pulse string, a characteristic burst is identified. The characteristic burst may be preset and adjusted according to actual applications. For example, the characteristic is a value XXYX, XXXYX or XXXXYX, where X=0 or 1 and Y is 1 or 0, e.g., a 0010 burst. The comparing circuit 132 monitors and compares the width and a predetermined state of the characteristic burst to a burst signal without attenuation or deformation, and outputs the comparison result to the adjustment/selection output signal circuit 133. If the width of the characteristic burst is too large, the adjustment/selection signal output circuit 133 outputs the selection signal to reduce the stage of the multi-stage equalization circuit 11 and/or outputs the adjustment signal to reduce the equalization value of the equalization circuit 11. If the width of the characteristic burst is too small, the adjustment/selection signal output circuit 133 outputs the selection signal to increase the stage of the multi-stage equalization circuit 11 and/or outputs the adjustment signal to increase the equalization value of the multi-stage equalization circuit 11. The above process is repeatedly performed until the equalized signal reaches the target equalization value. Take a multi-stage equalization circuit that includes three stages of equalization circuits for example, and refer to FIG. 2 showing a block diagram of an application of the analog equalizer according to a first embodiment of the present invention. As shown in FIG. 2, the multi-stage equalization circuit 11 includes a first-stage equalization circuit 111, a second-stage equalization circuit 112 and a third-stage equalization circuit 113.

The first-stage equalization circuit 111 has its input end receive a high-speed signal IN to be equalized, and its output end connected to an input end of the analog multiplexer 12 and an input end of the second-stage equalization circuit 112. The first-stage equalization circuit 111 receives an adjustment signal SEL1 outputted by the adjusting circuit 13, and adjusts at least one of a tunable resistor, a tunable capacitor and a tunable current source in the first-stage equalization circuit 111 according to the adjustment signal SEL1, such that the first-stage equalization circuit 111 outputs a first-stage equalization signal IN1 after performing an equalization operation on the high-speed signal IN according to predetermined requirements.

The second-stage equalization circuit 112 has its input end receive the first-stage equalized signal IN1, and its output end connected to another input end of the analog multiplexer 12 and an input end of the third-stage equalization circuit 113. The second-stage equalization circuit 112 receives an adjustment signal SEL2 outputted by the adjusting circuit 13, and adjusts at least one of a tunable resistor, a tunable capacitor and a tunable current source in the second-stage equalization circuit 112 according to the adjustment signal SEL2, such that the second-stage equalization circuit 112 outputs a second-stage equalization signal IN2 after performing an equalization operation on the first-stage equalized signal IN1 according to predetermined requirements.

The third-stage equalization circuit 113 has its input end receive the second-stage equalized signal IN2, and its output end connected to yet another input end of the analog multiplexer 12. The third-stage equalization circuit 113 receives an adjustment signal SEL3 outputted by the adjusting circuit 13, and adjusts at least one of a tunable resistor, a tunable capacitor and a tunable current source in the third-stage equalization circuit 113 according to the adjustment signal SEL3, such that the third-stage equalization circuit 113 outputs a second-stage equalization signal IN3 after performing an equalization operation on the second-stage equalized signal IN2 according to predetermined requirements.

The analog multiplexer 12 has its three input ends respectively connected to the output ends of the first-stage equalization circuit 111, the second-stage equalization circuit 112 and the third-stage equalization circuit 113. The analog multiplexer 12 receives a selection signal SELA outputted by the adjusting circuit 13, and selects equalization circuits of different stages according to the selection signal SELA, so as to cause an equalization value of an equalized signal OUT at the output end of the analog multiplexer 12 to be equal to the target equalization value corresponding to the selected equalization circuit. That is, the equalized signal OUT of the analog multiplexer 12 is the first-stage equalized signal IN1, the second-stage equalized signal IN2 or the third-stage equalized signal IN3.

An input end of the clock data recovery circuit 131 in the adjusting circuit 13 is connected to the equalized signal OUT of the analog multiplexer 12, and an output end of the adjustment/selection signal output circuit 133 outputs the adjustment signal SEL1, the adjustment signal SEL2, the adjustment signal SEL3 and the selection signal SELA.

For example, assuming that the analog equalizer includes three ranges of target equalization values. The target equalization value is a gain compensation that a high-speed signal to be equalized obtains from using an equalizer. The first range is 0 to 10 dB, the second range is 10 to 20 dB, and the third range is 20 to 30 dB. Each of the ranges includes 10 incremental steps, each corresponding to 1 dB. The first-stage equalization circuit corresponds to the first range. The first-stage equalization circuit and the second-stage equalization circuit are connected to correspond to the second range. The first-stage equalization circuit, the second-stage equalization circuit and the third-stage equalization circuit are connected to correspond to the third range. To have the analog equalizer 100 output a 15 dB equalization value, the analog multiplexer 12 first selects a range, e.g., the second range, to generate an equalized signal OUT. Assume that the equalization value of the equalized signal OUT is 10, this equalized signal OUT is outputted to the clock data recovery circuit 131 in the adjusting circuit 13, and the clock data recovery circuit 131 generates a clock signal to re-sample the equalized signal OUT to obtain a pulse string. When the clock data recovery circuit 131 operates in a first mode, the clock data recovery circuit 131 generates the clock signal according to a signal transmitted in an HDMI interface clock channel. For example, the first mode is an HDMI interface mode or an MHL interface mode. When the clock data recovery circuit 131 operates in a second mode, the clock data recovery circuit 131 generates the clock signal according to frequency information included in the equalized signal. For example, the second mode is a DP interface mode, a USB interface mode or a V-by-one interface mode developed in image transmission. The characteristic burst is identified from the recovered pulse string, and the characteristic burst may be preset and adjusted according to actual applications. For example, the characteristic burst is a value XXYX, XXXYX, or XXXXYX, where X=0/1 and Y=1/0, e.g., a 0010 burst. The comparing circuit 132 monitors the width and a predetermined state of the characteristic burst, compares the characteristic burst with a signal pulse without attenuation or deformation, and outputs the comparison result to the adjustment/selection signal output circuit 133. The adjustment/selection signal output circuit 133 then adjusts the first-stage equalization circuit and the second-stage equalization circuit to higher gains (adjusting the step in the second range to a larger value), so as to control the adjustment signal SEL1 and the adjustment signal SEL2 that the adjustment/selection signal output circuit 133 outputs to the multi-stage equalization circuit 11, and to further adjust the equalization value of the multi-stage equalization circuit 11 to gradually achieve the target equalization value 15 dB.

As the range increases, the stage of the equalization circuit adopted by the analog equalizer also correspondingly increases. As such, the power that the analog equalizer outputs gradually increases, and a frequency peak outputted by the analog equalizer, e.g., a frequency peak that the analog equalizer is capable of compensating, also gradually increases. From another perspective, when a high-speed suffers from smaller channel attenuation in the transmission process, a lower range of the analog equalizer is selected to compensate a smaller frequency peak, so as to achieve equalization of the high-speed signal by a lower power while satisfying the frequency response of the high-speed signal. When a high-speed signal suffers from larger channel attenuation in the transmission process, a higher range of the analog equalizer is selected to compensate a higher frequency peak, so as to achieve equalization of the high-speed signal by an appropriate power while satisfying the frequency response of the high-speed signal. In the embodiment, the frequency peak refers to a difference between a maximum gain and a minimum gain in a frequency response curve of the analog equalizer.

Figure 3:
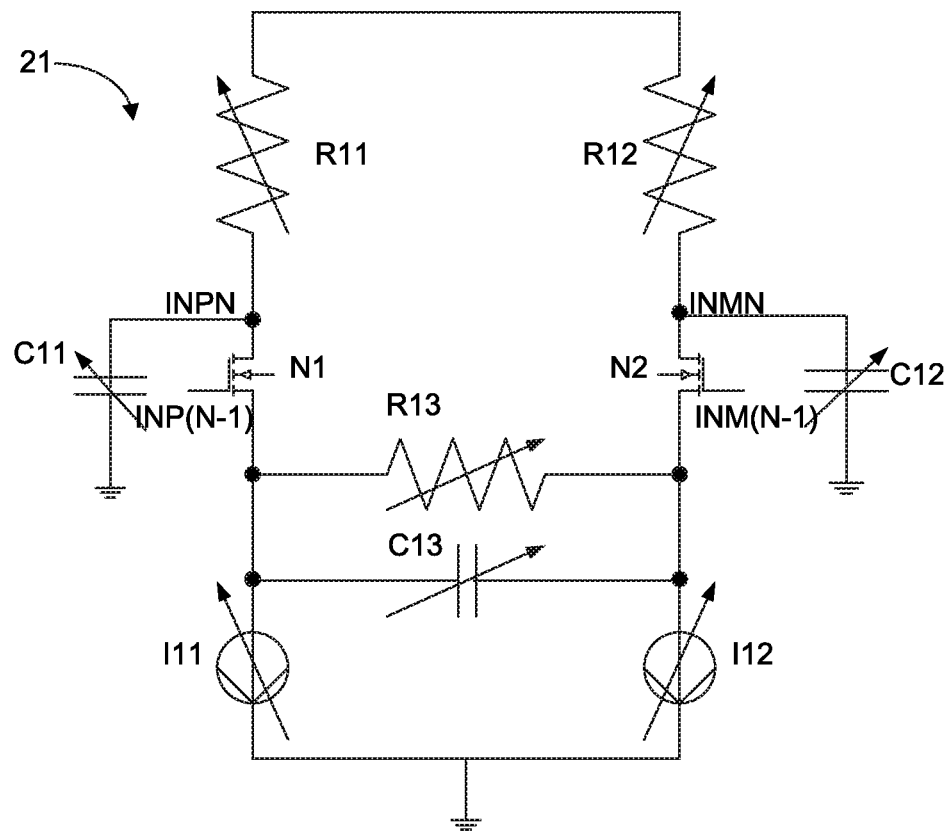
FIG. 3 is a circuit diagram of an equalization circuit in FIG. 1 according to the first embodiment of the present invention.

FIG. 3 shows a circuit diagram of the equalization circuit according to the first embodiment of the present invention. The equalization circuit shown in FIG. 3 is exemplified by an NMOS circuit. As shown in FIG. 3, the $N^{th}$-stage equalization circuit includes an amplification module 21. The amplification module 21 includes a first NMOS transistor N1, a second NMOS transistor N2, a first tunable resistor R11, a second tunable resistor R12, a third tunable resistor R13, a first tunable capacitor C11, a second tunable capacitor C12, a third tunable capacitor C13, a first tunable current source I11 and a second tunable current source I12.

The first NMOS transistor N1 and the second NMOS transistor N2 have respective gates receive differential input signals (INP(N−1) and INM(N−1)), and respective drains output different output signals (INPN and INMN). The first NMOS transistor N1 further has its drain connected to one end of the first tunable resistor R11 and one end of the first tunable capacitor C11. The second NMOS transistor N2 further has its drain connected to one end of the second tunable resistor R12 and one end of the second tunable capacitor C12. The first tunable resistor R11 has its other end connected to the other end the second tunable resistor R12. The first tunable capacitor C11 and the second tunable capacitor C12 have respective other ends connected to ground. The first NMOS transistor N1 has its source connected to one end of the third tunable resistor R13, one end of the third tunable capacitor C13, and an input end of the first tunable current source I11. The second NMOS transistor N2 has its source connected to the other end of the third tunable resistor R13, the other end of the third tunable capacitor C13, and an input end of the second tunable current source I12. The first tunable current source I11 and the second tunable current source I12 have respective output ends connected to ground.

When the $N^{th}$-stage equalization circuit is the first-stage equalization circuit, the differential input signals received by the gates of the first NMOS transistor N1 and the second NMOS transistor N2 are high-speed signals to be equalized, and the differential output signals outputted by the drains of the first NMOS transistor N1 and the second NMOS transistor N2 are first-stage equalized signals (INP1 and INM1). When the $N^{th}$-stage equalization circuit is the second-stage equalization circuit, the differential input signals received by the gates of the first NMOS transistor N1 and the second NMOS transistor N2 are the first-stage equalized signals (INP1 and INM1) outputted by the first-stage equalization circuit, and the differential output signals outputted by the drains of the first NMOS transistor N1 and the second NMOS transistor N2 are second-stage equalized signals (INP2 and INM2). The input signals and output signals of the equalization circuits of other stages are deduced similarly, and associated details are omitted for brevity. It should be noted that, the first-stage equalized signal IN1 and the first-stage equalized signals (INP1 and INM1) are two different expressions for the same signal, and the same applies to the equalized signals of other stages.

In the embodiment, the amplification module 21 may match the frequency response of high-speed signals of different rates in DP, HDMI and USB, for example, through adjusting the tunable resistor, the tunable capacitor and the tunable current source, so as to realize the equalization operations according to requirements. The tunable current source is for adjusting a bias current.

More specifically, when output current(s) of the first tunable current source I11 and/or the second tunable current source I12 become(s) larger, the amplification module 21 realizes amplification of a high bandwidth to satisfy the equalization of a high-speed signal in a high speed. When output current(s) of the first tunable current source I11 and/or the second tunable current source I12 become(s)

smaller, the amplification module 21 realizes amplification of a low bandwidth to satisfy the equalization of a high-speed signal in a low speed.

When a resistance value of the third tunable resistor R13 increases, the amplification module 21 realizes amplification of a low bandwidth. When a resistance value of the third tunable resistor R13 decreases, the amplification module 21 realizes amplification of a high bandwidth.

When a capacitance value of the third tunable capacitor C13 increases, the frequency peak that the amplification module 21 can compensate increases. When a capacitance value of the third tunable capacitor C13 decreases, the frequency peak that the amplification module 21 can compensate decreases.

Figure 4:
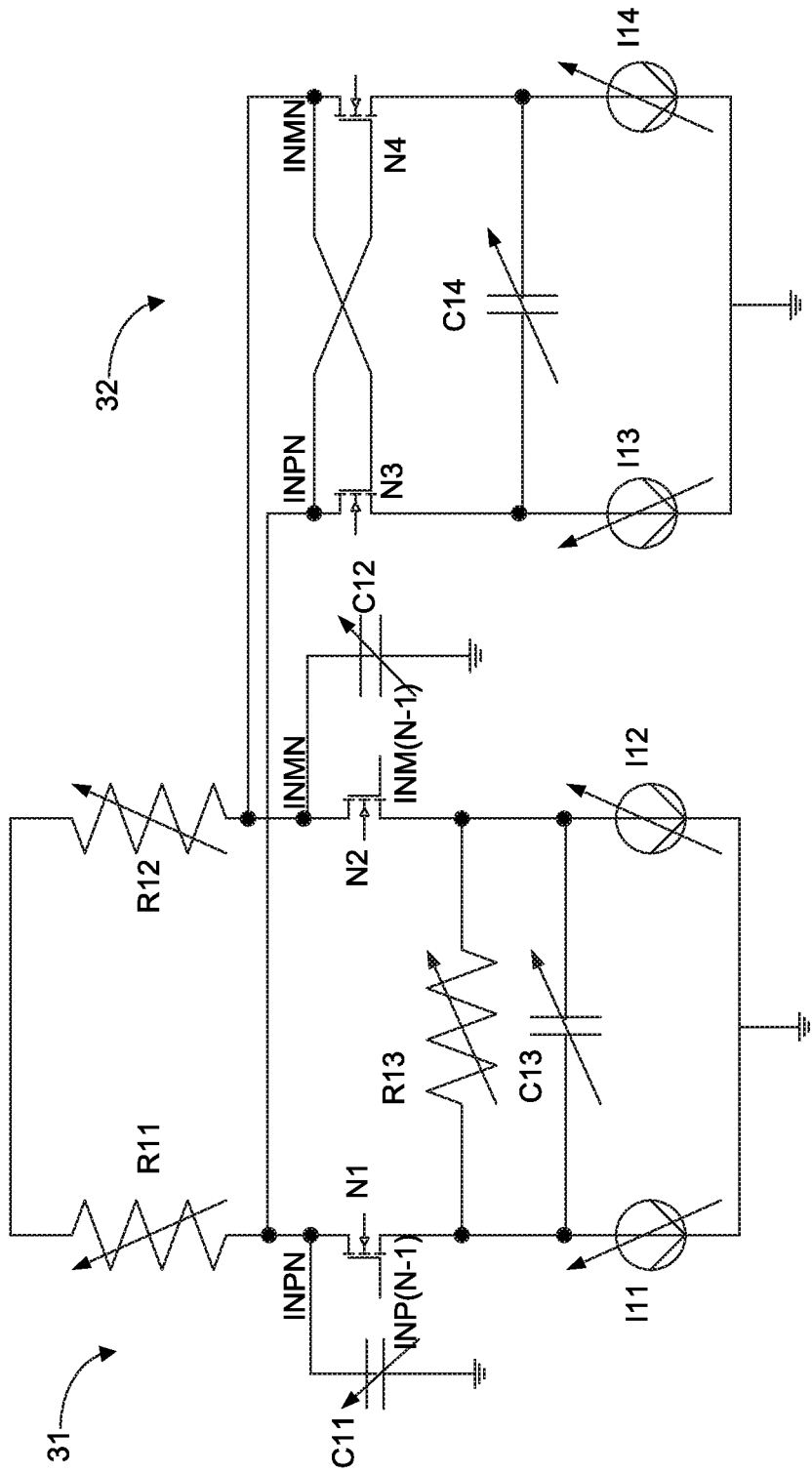
FIG. 4 is a circuit diagram of an equalization circuit in FIG. 1 according to a second embodiment of the present invention.

FIG. 4 shows a circuit diagram of the equalization circuit in FIG. 1 according to a second embodiment of the present invention. FIG. 4 shows an equalization circuit exemplified by an NMOS circuit. As shown in FIG. 4, the $N^{th}$-stage equalization circuit includes an amplification circuit 31 and a latch module 32. In this embodiment, the amplification module 31 is identical to the amplification module 21 in FIG. 3, and associated details shall be omitted for brevity.

In this embodiment, the latch module 32 includes a third NMOS transistor N3, a fourth NMOS transistor N4, a fourth tunable capacitor C14, a third tunable current source I13 and a fourth tunable current source I14.

The third NMOS transistor N3 has its drain connected to the drain of the first NMOS transistor N1 and the gate of the fourth NMOS transistor N4. The fourth NMOS transistor N4 has its drain connected to the drain of the second NMOS transistor N2 and the gate of the third NMOS transistor N3. The third NMOS transistor N3 has its source connected to one end of the fourth tunable capacitor C14 and an input end of the third tunable current source I13. The fourth NMOS transistor N4 has its source connected to the other end of the fourth tunable capacitor C14 and an input end of the fourth tunable current source I14. The third tunable current source I13 and the fourth tunable current source I14 have respective output ends connected to ground.

In this embodiment, the latch module 32 buffers the different output signals (INPN and INMN) outputted from the amplification module 31 to match signal transmission between the amplification module 31 and the analog multiplexer 12.

Figure 5:
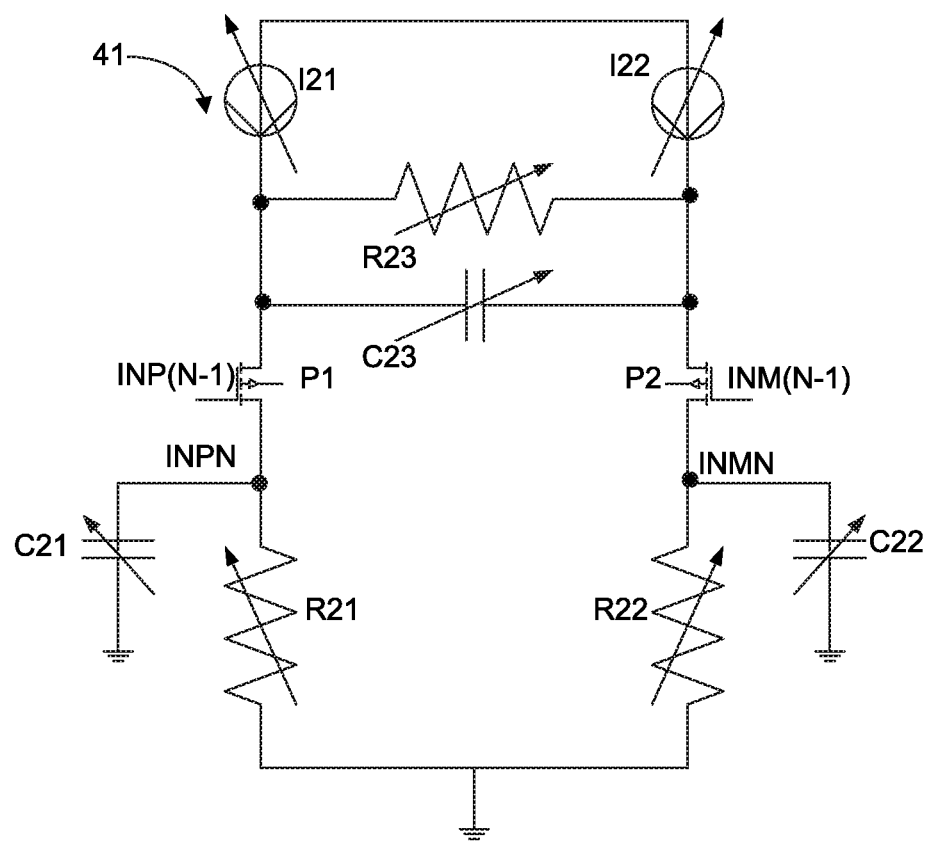
FIG. 5 is a circuit diagram of an equalization circuit in FIG. 1 according to a third embodiment of the present invention.

FIG. 5 shows a circuit diagram of the equalization circuit in FIG. 1 according to a third embodiment of the present invention. The equalization circuit in FIG. 5 is exemplified by a PNMOS circuit. As shown in FIG. 5, an $N^{th}$-stage equalization circuit includes an amplification module 41. The amplification module 41 includes a first PMOS transistor P1, a second PMOS transistor P2, a first tunable resistor R21, a second tunable resistor R22, a third tunable resistor R23, a first tunable capacitor C21, a second tunable capacitor C22, a third tunable capacitor C23, a first tunable current source I21 and a second tunable current source I22.

The first PMOS transistor P1 and the second PMOS transistor P2 have respective gates receive differential input signals (INP(N−1) and INM(N−1)), and respective sources output different output signals (INPN and INMN). The first PMOS transistor P1 further has its source connected to one end of the first tunable resistor R21 and one end of the first tunable capacitor C21. The second PMOS transistor P2 further has its source connected to one end of the second tunable resistor R22 and one end of the second tunable capacitor C22. The first tunable resistor R21 has its other end connected to the other end the second tunable resistor R22 and then grounded. The first tunable capacitor C21 and the second tunable capacitor C22 have respective other ends connected to ground. The first PMOS transistor P1 has its drain connected to one end of the third tunable resistor R23, one end of the third tunable capacitor C23, and an output end of the first tunable current source I21. The second PMOS transistor P2 has its drain connected to the other end of the third tunable resistor R23, the other end of the third tunable capacitor C23, and an output end of the second tunable current source I22. The first tunable current source I21 has its input end connected to an input end of the second tunable current source I22.

Details of adjusting the equalization circuit in FIG. 5 according to the third embodiment are similar to those of adjusting the equalization circuit in FIG. 3 according to the first embodiment. One difference between the two is that, the equalization circuit of the first embodiment is an NMOS circuit, and the equalization circuit of the third embodiment is a PMOS circuit. Associated details of the adjustment operation are omitted for brevity.

Figure 6:
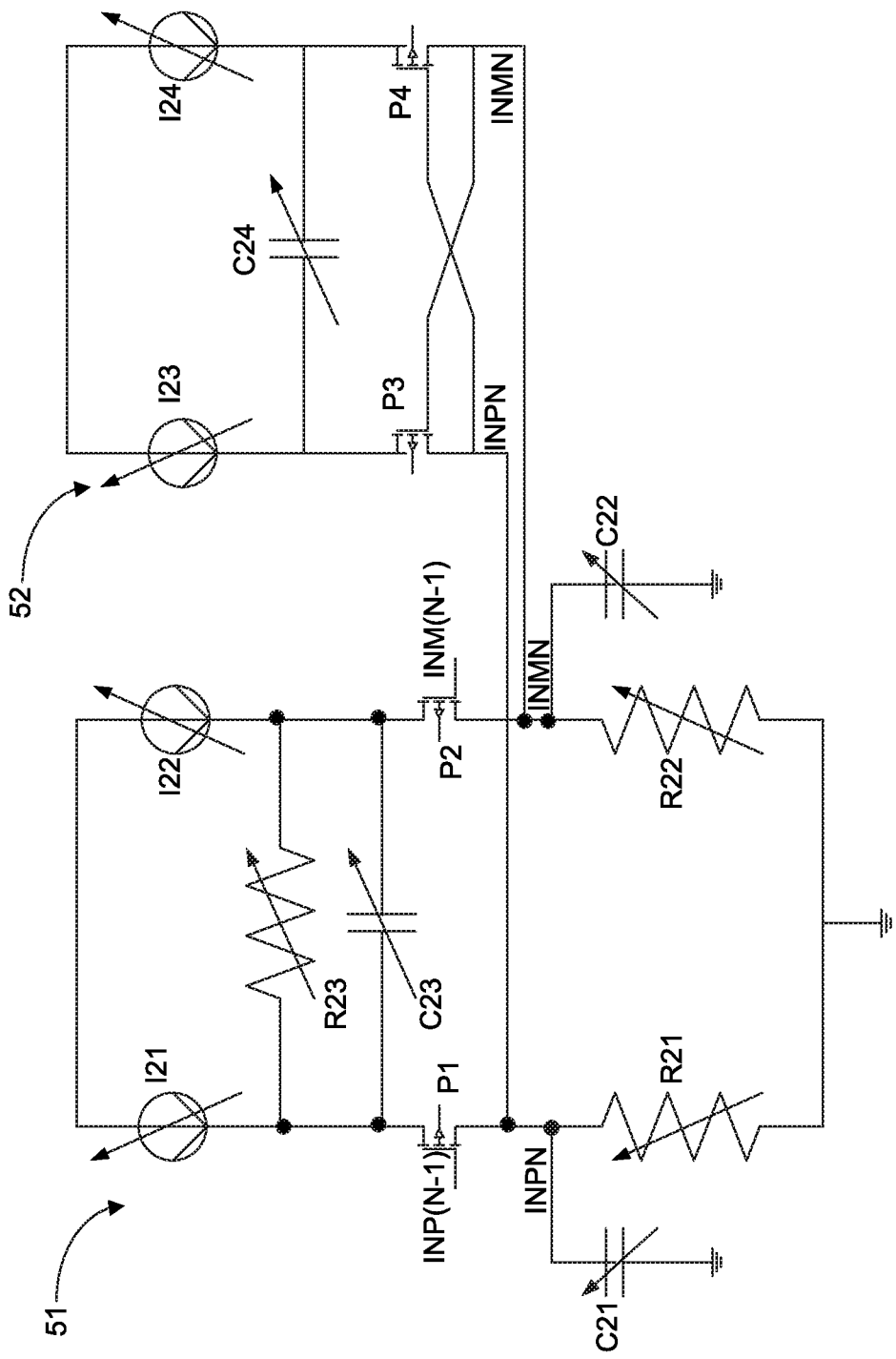
FIG. 6 is a circuit diagram of an equalization circuit in FIG. 1 according to a fourth embodiment of the present invention.

FIG. 6 shows a circuit diagram of the equalization circuit in FIG. 1 according to a fourth embodiment of the present invention. The equalization circuit in FIG. 6 is exemplified by a PMOS circuit. As shown in FIG. 6, an $N^{th}$-stage equalization circuit includes an amplification module 51 and a latch module 52. In this embodiment, the amplification module 51 is identical to the amplification module 41 in FIG. 5, and repeated details are omitted for brevity.

In this embodiment, the latch module 52 includes a third PMOS transistor P3, a fourth PMOS transistor P4, a fourth tunable capacitor C24, a third tunable current source I23 and a fourth tunable current source I24.

The third PMOS transistor P3 has its source connected to the source of the first PMOS transistor P1 and the gate of the fourth PMOS transistor. The fourth PMOS transistor P4 has its source connected to the source of the second PMOS transistor P2 and the gate of the third PMOS transistor P3. The third PMOS transistor P3 has its drain connected to one end of the fourth tunable capacitor C24 and an output end of the third tunable current source I23. The fourth PMOS transistor P4 has its drain connected to the other end of the fourth tunable capacitor C24 and an output end of the fourth tunable current source I24. The third tunable current source I23 has its input end connected to an input end of the fourth tunable current source I24.

In this embodiment, the latch module 52 buffers the differential output signals (INPN and INMN) outputted from the amplification module 51 to match signal transmission between the amplification module 51 and the analog multiplexer 12.

Figure 7:
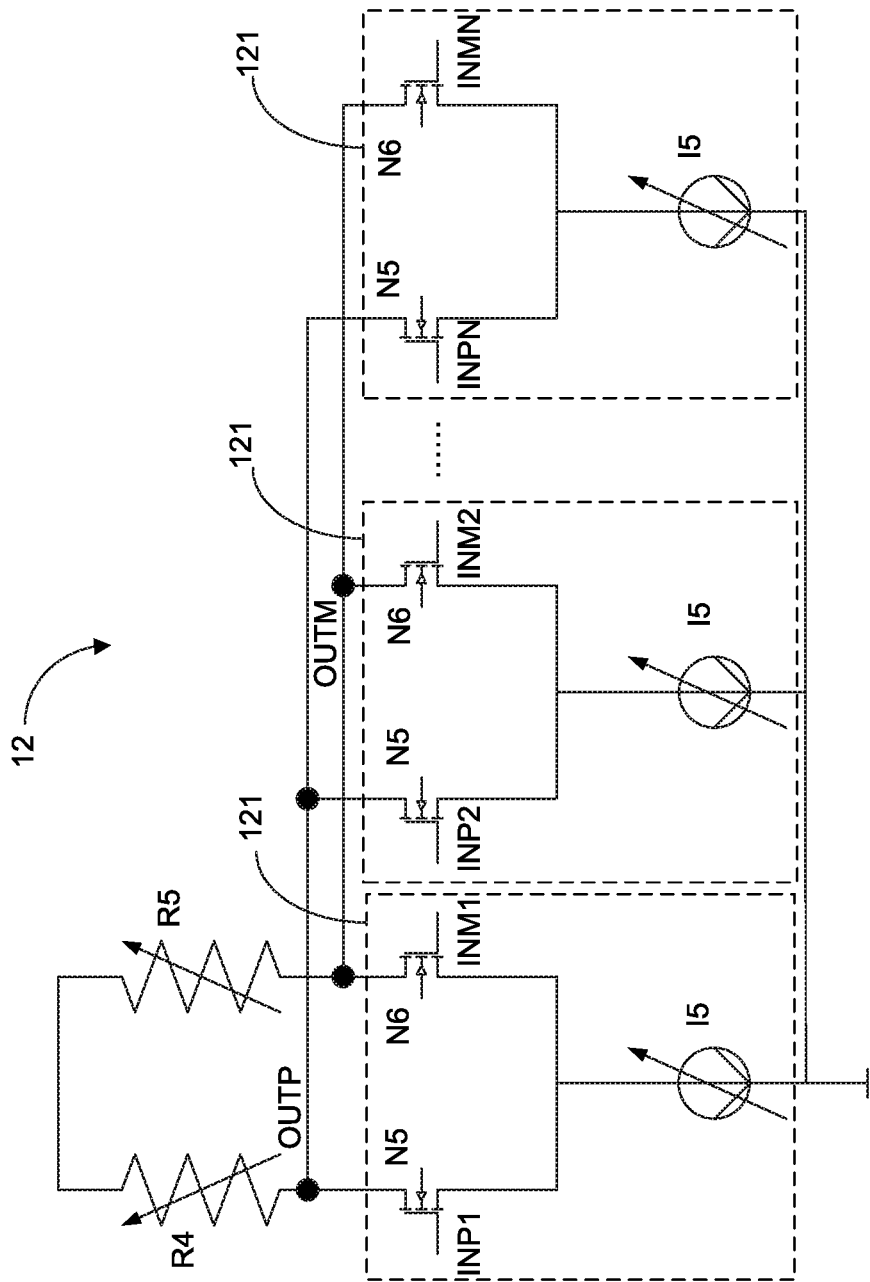
FIG. 7 is a circuit diagram of an analog multiplexer in FIG. 1 according to an embodiment of the present invention.

FIG. 7 shows a circuit diagram of the analog multiplexer in FIG. 1. As shown in FIG. 7, the analog multiplexer 12 includes a fourth tunable resistor R4, a fifth tunable resistor R5 and multiple input modules 121. The input modules 121 correspond to the equalization circuits in the cascade multi-stage equalization circuits, respectively. Each of the input modules 121 includes a fifth NMOS transistor N5, a sixth NMOS transistor NMOS N6 and a fifth tunable current source I5.

The gates of the fifth NMOS N5 and the sixth NMOS N6 of the input module 121, i.e., one input end of the analog multiplexer 12, receive the differential output signals outputted from the corresponding equalization circuit. More specifically, the first input module 121 receives the differential output signals outputted from the first-stage equalization circuit, i.e., the first-stage equalized signals (INP1 and INM1); the second input module 121 receives the differential output signals outputted from the second-stage equalization circuit, i.e., the second-stage equalized signals (INP2 and INM2); . . . and the $N^{th}$-stage input module 121 receives the differential output signals (INPN and INMN) outputted from the $N^{th}$-stage equalization circuit 121, i.e., the $N^{th}$-stage equalized signals. The drains of the fifth NMOS transistor N5 and the sixth transistor N6 in the input module 121, i.e., an output end of the analog multiplexer, output the equalized high-speed signals (OUTP and OUTM).

The fifth tunable current source I5 in the input module 121 receives the adjustment signal outputted from the adjusting circuit 13.

The fifth NMOS transistor N5 has its drain connected to one end of the fourth tunable resistor R4. The sixth NMOS transistor N6 has its drain connected to one end of the fifth tunable resistor R5. The fourth resistor R4 has its other end connected to the other end of the fifth tunable resistor R5. The fifth NMOS transistor N5 and the sixth NMOS transistor N6 have respective sources connected to each other and then connected to an input end of the fifth tunable current source I5. The fifth tunable current source I5 has its output end connected to ground.

In this embodiment, the analog multiplexer 12 determines whether the equalized high-speed signals (OUTP and OUTM) are the first-stage equalized signals (INP1 and INM1), the second-stage equalized signals (INP2 and IMN2), . . . or the $N^{th}$-stage differential output signals (INPN and INMN) according to the equalization range selected by the user.

The selection signal outputted by the adjusting circuit 13 is connected to the current sources 15 in the input modules 121 of the analog multiplexer 12, and controls to whether adjust the current sources I5 to 0 according to the selection signal to perform disconnection.

That is to say, in the embodiment, when the analog multiplexer 12 determines that the equalized high-speed signals (OUTP and OUTM) are the first-stage equalized signals (INP1 and INM1) according to the equalization range selected by the user, the current sources I5 in the input modules 121 other than the first input module 121 are adjusted to 0. When the analog multiplexer 12 determines that the equalized high-speed signals (OUTP and OUTM) are the second-stage equalized signals (INP2 and INM2) according to the equalization range selected by the user, the current sources I5 in the input modules 121 other than the second input module 121 are adjusted to 0. When the analog multiplexer 12 determines that the equalized high-speed signals (OUTP and OUTM) are the $N^{th}$-stage differential output signals (INPN and INMN) according to the equalization range selected by the user, the current sources I5 in the input modules 121 other than the $N^{th}$ input module 121 are adjusted to 0. The target equalization value gets larger as the equalization range gets higher, and the stage of the equalized signal outputted by the analog multiplexer 12 also gets higher.

Again referring to FIG. 1, in this embodiment, the first-stage equalization circuit, similar to the circuit types of other equalization circuits of other stages, is one of an NMOS circuit and a PMOS circuit. The circuit type of the first-stage equalization circuit is determined by a potential of a high-speed signal to be equalized—an NMOS circuit is selected when the high-speed signal has a higher potential, and a PMOS circuit is selected when the high-speed signal has a lower potential.

In another embodiment, the circuit type of the first-stage equalization circuit may be different from those of the equalization circuits of other stages. More specifically, when the first-stage equalization circuit is an NMOS circuit, the equalization circuits of the other stages may be PMOS circuits; when the first-stage equalization circuit is a PMOS circuit, the equalization circuits of the other stages may be NMOS circuits.

Further, in this embodiment, to achieve the equalization of a high bandwidth for a high-speed signal in a high speed, the number of stages of the cascade equalization circuit is preferably three. More specifically, when the speed of the high-speed signal is greater than 5 Gb/s, the number of stages of the cascade equalization circuit is preferably three.

Figure 8:
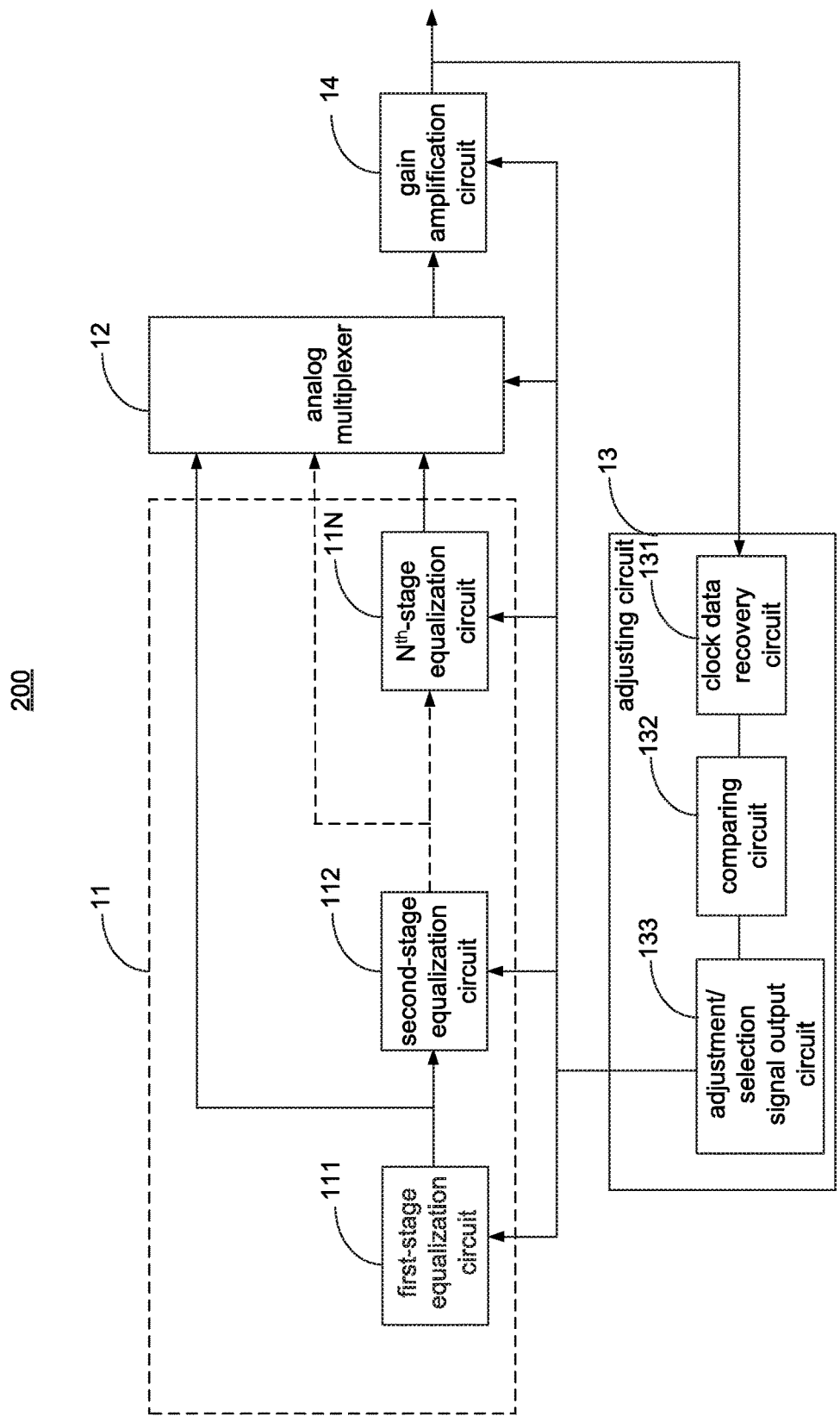
FIG. 8 is a block diagram of an analog equalizer according to the second embodiment of the present invention.

FIG. 8 shows a block diagram of an analog equalizer according to a second embodiment of the present invention. As shown in FIG. 8, a difference of an analog equalizer 200 from the analog equalizer 100 in FIG. 1 is that, the analog equalizer 200 further includes a gain amplification circuit 14.

The gain amplification circuit 14, coupled to the analog multiplexer 12, receives the selection signal outputted from the adjusting circuit 13, and adjusts the gain of the equalized high-speed signal.

In this embodiment, the gain amplification circuit 14 and the cascaded multi-stage equalization circuit 11 have the same circuit structure. Although the cascaded multi-stage equalization circuit 11 and the gain amplification circuit 14 have the same structure, due to different adjusted parameters of the tunable resistors, the tunable capacitors and the tunable current sources adjusted by the adjustment signal, effects caused in the analog equalizer by the two are also different. More specifically, the cascaded multi-stage equalization circuit 11 realizes different frequent peak compensations for high-speed signals with different channel attenuation levels, and the gain amplification circuit 14 realizes the gain amplification of the equalized high-speed signals.

The present invention provides following benefits as opposed to the prior art. In the present invention, by receiving the adjustment signal and the selection signal outputted from the adjusting circuit, adjusting at least one of the tunable resistors, the tunable capacitors and the tunable current sources according to the adjustment signal, and selecting equalization circuits of different stages according to the selection signal, the analog equalizer causes an actual output value of the analog equalizer to be substantially equal to a target equalization value corresponding to the selected equalization circuit. With the above approach, the present invention is capable of adaptively configuring the target equalization value outputted by the simulated equalizer, thereby achieving equalization for different high-speed signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An analog equalizer, for equalizing a signal to be equalized, comprising:
    an adjusting circuit, generating an adjustment signal and a selection signal;
    a cascaded multi-stage equalization circuit, receiving the adjustment signal, and adjusting at least one of a tunable resistor, and a tunable current source in cascaded multi-stage equalization circuit according to the adjustment signal to perform an equalization process on the signal to be equalized; and an analog multiplexer, coupled to the cascaded multi-stage equalization circuit and the adjusting circuit, receiving the selection signal, and selecting and outputting an equalized signal outputted from one stage of the multi-stage equalization circuit;

wherein, the adjusting circuit adjusts the adjustment signal and the selection signal according to the equalized signal outputted from the analog multiplexer and a target equalization value.

2. The analog equalizer according to claim 1, wherein the adjusting circuit comprises:

a clock data recovery circuit, generating a clock signal, recovering the equalized signal into a pulse string according to the clock signal a comparing circuit, coupled to the clock data recovery circuit, comparing the pulse string with a predetermined burst to obtain a comparison result; and an adjustment/selection signal output circuit, coupled to the comparing circuit, outputting the adjustment signal and the selection signal according to the comparison result.

3. The analog equalizer according to claim 2, wherein the clock data recovery circuit re-samples the equalized signal according to the clock signal to obtain the pulse string.

4. The analog equalizer according to claim 2, wherein the comparing circuit compares a characteristic burst in the pulse string with the predetermined burst to obtain the comparison result.

5. The analog equalizer according to claim 3, wherein when the clock data recovery circuit operates in a first mode, the clock data recovery circuit generates the clock signal according to a signal transmitted in an interface clock channel; when the clock data recovery circuit operates in a second mode, the clock data recovery circuit generates the clock signal according to frequency information in the equalized signal.

6. The analog equalizer according to claim 4, wherein the comparing circuit compares the characteristic burst with the predetermined burst, and the predetermined burst is a signal burst without attenuation or deformation in a predetermined state.

7. The analog equalizer according to claim 6, wherein the adjustment/selection signal output circuit repeats outputting the adjustment signal and the selection signal for the equalization process until the equalized signal reaches the target equalization value.

8. The analog equalizer according to claim 1, wherein the multi-stage equalization circuit comprises an amplification module; the amplification module comprises a first MOS transistor, a second MOS transistor, a first tunable resistor, a second tunable resistor, a third tunable resistor, a first tunable capacitor, a second tunable capacitor, a third tunable capacitor, a first tunable current source and a second tunable current source; the first MOS transistor and the second MOS transistor have respective first input ends receive a differential input signal, and respectively second input ends output a differential output signal; the first MOS transistor further has the second input end connected to one end of the first tunable resistor and one end of the first tunable capacitor; the second MOS transistor further has the second input end connected to one end of the second tunable resistor and one end of the second tunable capacitor; the first tunable resistor has one other end connected to one other end of the second tunable resistor; one other end of the first tunable capacitor and one other end of the second tunable capacitor are connected to ground; the first MOS transistor has a third end connected to one end of the third tunable resistor, one end of the third tunable capacitor and a first end of the first tunable current source; the second MOS transistor has a third end connected to one other end of the third tunable resistor, one other end of the third tunable capacitor and a first end of the second tunable current source; and the first tunable current source has a second end connected to a second end of the second tunable current source.

9. The analog equalizer according to claim 8, wherein the multi-stage equalization circuit further comprises a latch module; the latch module comprises a third MOS transistor, a fourth MOS transistor, a fourth tunable capacitor, a third tunable current source and a fourth tunable current source; the third MOS transistor has a second end connected to the second input end of the first MOS transistor and a first end of the fourth MOS transistor; the fourth MOS transistor has a second end connected to the second input end of the second MOS transistor and a first end of the third MOS transistor; the third MOS transistor has a third end connected to one end of the fourth tunable capacitor and a first end of the third tunable current source; the fourth OS transistor has a third end connected to one other end of the fourth tunable capacitor and a first end of the fourth tunable current source; and the third tunable current source has a second end connected to a second end of the fourth tunable current source.

10. The analog equalizer according to claim 8, wherein when the first MOS transistor is an NMOS transistor, the first end, the second end and the third end of the first MOS transistor are a gate, a drain and a source of the NMOS transistor, respectively, the first end and the second end of the first tunable current source are an input end and an output end, respectively, and the output end of the first tunable current source is connected to ground.

11. The analog equalizer according to claim 8, wherein when the first MOS transistor is a PMOS transistor, the first end, the second end and the third end of the first MOS transistor are a gate, a drain and a source of the PMOS transistor, respectively, the first end and the second end of the first tunable current source are an output end and an input end, respectively, and the one other end of the first tunable resistor and the one other end of the second tunable resistor are connected and then grounded.

12. The analog equalizer according to claim 8, wherein when an output current of one of the first adjustable current and the second tunable current source increases, a bandwidth of the multi-stage equalization circuit becomes larger.

13. The analog equalizer according to claim 8, wherein when a capacitance value of the third tunable capacitor increases, a frequency peak that the multi-stage equalization circuit is capable of compensating becomes larger.

14. The analog equalizer according to claim 8, wherein the analog multiplexer comprises a fourth tunable resistor, a fifth tunable resistor and a plurality of input modules; the input modules respectively correspond to a plurality of stages of the multi-stage equalization circuit; each of the input modules comprises a fifth NMOS transistor, a sixth NMOS transistor and a fifth tunable current source; the fifth NMOS transistor and the sixth NMOS transistor have respective gates receive the corresponding differential output signal outputted from the multi-stage equalization circuit; the fifth NMOS transistor and the sixth NMOS transistor have respective drains output an equalized high-speed signal; the fifth NMOS transistor has a drain connected to one end of the fourth tunable resistor; the sixth NMOS transistor has the drain connected to one end of the fifth tunable resistor; the fourth tunable resistor has one other end connected to one other end of the fifth tunable resistor; the fifth NMOS transistor has a source connected to a source of the sixth NMOS transistor and then connected to an input end of the fifth tunable current source; the fifth tunable current source has an output end connected to ground.

15. The analog equalizer according to claim 1, wherein a plurality of circuit types of a plurality of stages of the multi-stage equalization circuit are identical, and each of the circuit types is one of an NMOS circuit and a PMOS circuit.

16. The analog equalizer according to claim 1, wherein a plurality of circuit types of a plurality of stages of the multi-stage equalization circuit are different; when a first stage of the multi-stage equalization circuit is an NMOS circuit, each of the other stages of the multi-stage equalization circuit is a PMOS circuit; when the first stage of the multi-stage equalization circuit is a PMOS circuit, each of the other stages of the multi-stage equalization circuit is an NMOS circuit.

17. The analog equalizer according to claim 1, further comprising:
  a gain amplification circuit, coupled to the analog multiplexer, adjusting a gain of an equalized high-speed signal.

* * * * *